(No Model.)
A. C. EGGERS.
RUBBER BED PAN.
No. 399,508. Patented Mar. 12, 1889.
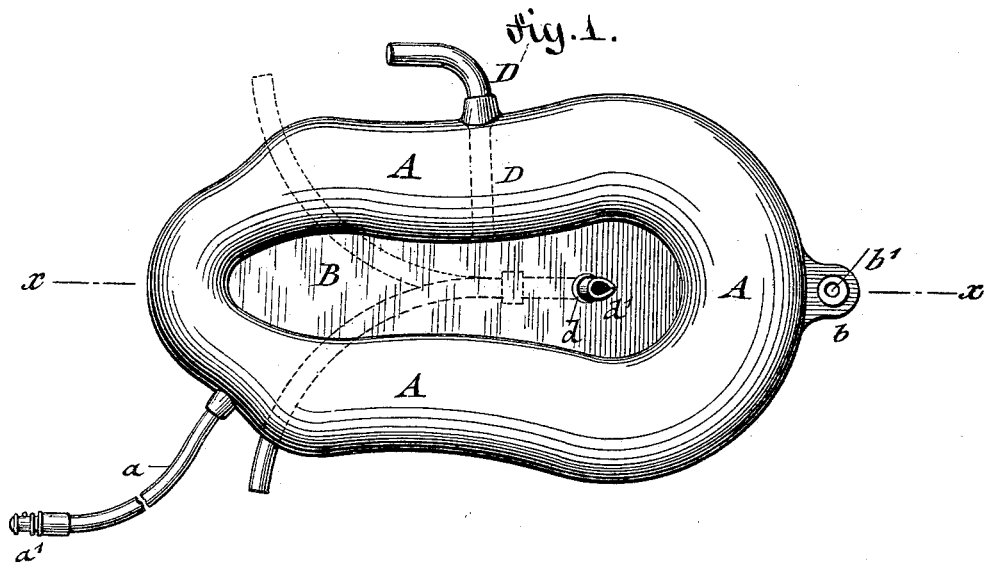
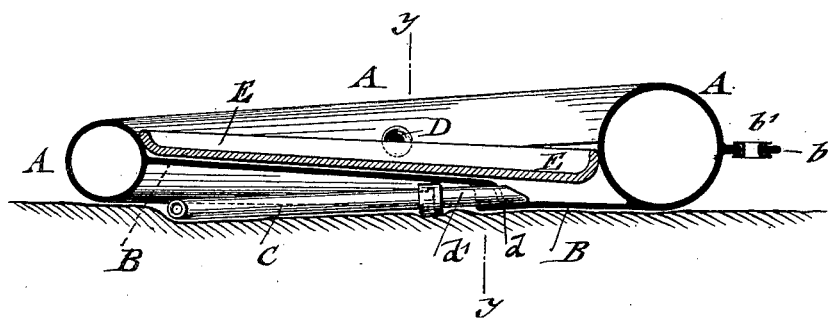
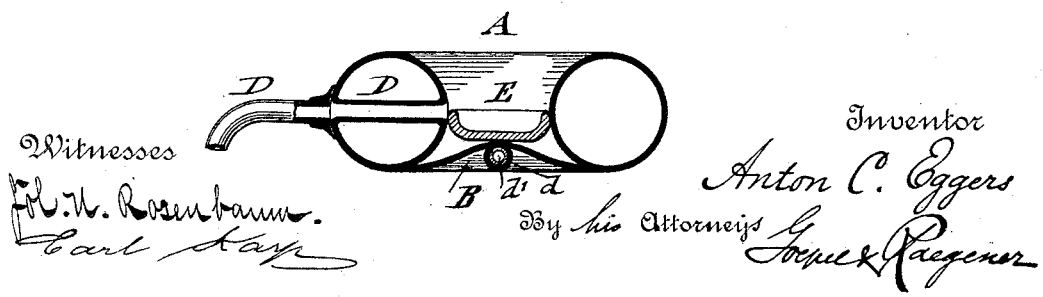
Witnesses
H. W. Rosenbaum
Carl Kapp
Inventor
Anton C. Eggers
By his Attorneys
Foque & Raegener

UNITED STATES PATENT OFFICE.

ANTON C. EGGERS, OF BATH BEACH, ASSIGNOR TO THE IDEAL RUBBER COMPANY, OF BROOKLYN, NEW YORK.

RUBBER BED-PAN.

SPECIFICATION forming part of Letters Patent No. 399,508, dated March 12, 1889.

Application filed June 9, 1888. Serial No. 276,594. (No model.)

*To all whom it may concern:*

Be it known that I, ANTON C. EGGERS, of Bath Beach, in the county of Kings, State of New York, have invented certain new and useful Improvements in Rubber Bed-Pans, of which the following is a specification.

This invention relates to an improved rubber bed-pan which is so constructed that it can be readily emptied and cleaned, and which is adapted to discharge at either side of the pan, so as to be more convenient for use; and the invention consists of a rubber bed-pan provided with an inflatable rim and a bottom or web, which extends at an inclined direction from the wider end of the rim toward the upper part of the narrow end of the rim, so as to form a discharge-spout for the liquid collected in the cavity inclosed by the rim. A fixed outlet-tube is attached to the bottom of the pan, and provided with a swiveled tube for discharging to either side of the pan, while an overflow-tube is passed transversely through the rim. A concave detachable bowl is inserted into the cavity of the bed-pan and retained by the rim, so as to protect the bottom.

In the accompanying drawings, Figure 1 represents a top view; Fig. 2, a vertical longitudinal section on line $x\,x$, Fig. 1; and Fig. 3, a vertical transverse section on line $y\,y$, Fig. 1, of my improved rubber bed-pan for invalids' use.

Similar letters of reference indicate corresponding parts.

A in the drawings represents the inflatable rim, and B the bottom web, of a rubber bed-pan of the usual shape and construction. The rim A is provided with an inflating-tube, $a$, having the usual valve, $a'$, by which the air forced into the rim for inflating the same is retained in the same. The rim A is further provided at its wider end of the rim with an ear, $b$, having a re-enforced eye, $b'$, by which the bed-pan can be conveniently hung up after use.

The parts so far described are old and well known, and form no part of my invention, which consists more especially in arranging the bottom B at a suitable inclination from the lower part of the wider end portion of the rim toward the upper part of the opposite narrower end of the rim, as shown clearly in Fig. 2. This inclination of the bottom B forms at the narrow end of the pan a kind of discharge-spout, by which the liquid collected in the cavity of the pan can be quickly and fully discharged without being retained in the fold or pocket formed in the bed-pans heretofore in use at the connection of the bottom with the bottom part of the rim. By this simple arrangement of the bottom the bed-pan is more readily emptied of its contents and kept clean easier, as it can be rinsed out with greater facility, so as to be more agreeable for use, and also more durable, as it is less exposed to deterioration by the liquid collected in the bottom fold of the pan.

The bottom B is provided with a socket, $d$, and a short fixed discharge-tube, $d'$, to which is swiveled a laterally-bent tube, C, which latter can be swung from a position at one side of the bed-pan to a position at the other side of the same, according as the liquid collected in the bed-pan is to be discharged to one side or the other of the bed. The bent tube C is made of hard rubber, for the purpose of preventing the closing of the tube by accidental pressure on the same. An overflow-tube, D, passes transversely through a side portion of the rim A, and discharges the liquid when the same reaches a certain height in the pan, so as to prevent the soiling of the bed. If desired, a concave porcelain or other bowl, E, the shape of which corresponds to the interior cavity of the pan, may be used in connection with the same and retained by the rim A, as shown in Figs. 2 and 3, whereby the pan is protected and can be kept intact for a greater length of time, while it renders the bed-pan cleaner when in use and less offensive, as the bowl can be readily detached from the pan and cleaned separately therefrom, and replaced when the pan is required for use.

Having thus described my invention, I claim as new and desire to secure by Letters Patent—

1. A rubber bed-pan provided with an inflatable rim and a bottom web secured at one end to the under side of the inflatable rim, and at the opposite end inclined upward and secured to the sides of the rim, so as to form a discharge-spout, substantially as set forth.

2. The combination, with a bed-pan having an inflatable rim and a bottom web, of a fixed discharge-tube connected to said web, and of a rigid discharge-tube swiveled to the fixed tube, so as to extend to either side of the pan, substantially as set forth.

3. The combination, with a bed-pan having an inflatable rim and a bottom web, of a detachable concave bowl corresponding in shape to the interior cavity of the pan, substantially as set forth.

In testimony that I claim the foregoing as my invention I have signed my name in presence of two subscribing witnesses.

ANTON C. EGGERS.

Witnesses:
PAUL GOEPEL,
JOHN A. STRALEY.